Jan. 27, 1959 T. G. COWAN 2,870,585
CONTROL CIRCUIT FOR FILLING OF CONTAINERS
Filed Aug. 6, 1956 5 Sheets-Sheet 1

INVENTOR.
TYSON G. COWAN

BY

ATTORNEY

Jan. 27, 1959  T. G. COWAN  2,870,585
CONTROL CIRCUIT FOR FILLING OF CONTAINERS
Filed Aug. 6, 1956  5 Sheets-Sheet 5

INVENTOR.
TYSON G. COWAN
BY
ATTORNEY

United States Patent Office 2,870,585
Patented Jan. 27, 1959

2,870,585

CONTROL CIRCUIT FOR FILLING OF CONTAINERS

Tyson G. Cowan, Campbell, Calif., assignor to Roy M. Magnuson; Genevieve I. Magnuson, executrix of said Roy M. Magnuson, deceased Application August 6, 1956, Serial No. 602,216

6 Claims. (Cl. 53—59)

This invention relates to an apparatus for the electronic control of the filling of a container and the method of operation thereof. More particularly this invention relates to an apparatus for the electronic control of a container filling machine and the method of operation thereof which may be pre-set to any desired value or number so as to control the container filling machine so that a pre-set number of objects, such as fruit, may be placed into each of the containers filled by said machine.

An object of this invention is to provide an improved method and apparatus for electronically controlling the operation of a container filling apparatus in accordance with the number of articles supplied to the container.

Another object of this invention is to provide an improved method and apparatus for electronically controlling the operation of a container filling apparatus so that certain pre-set numbers of articles as determined by an electronic counter, are supplied in sequence to one container after another.

Still another object of this invention is to provide an improved electronic control circuit which is connected to a light sensitive device that is associated with a light source and a conveyor carrying objects to be placed into a container, said objects being adapted to interrupt the light rays passing to the light sensitive cell from said light source so as to pulse said light rays whereby said light sensitive cell supplies electrical pulses to a preset pulse counting circuit which is connected to control the energization of a mechanical device that guides preset numbers of said objects to one container after another.

Other and further objects of this invention will be apparent to those skilled in the art to which it relates from the following specification and claims.

In accordance with this invention there is provided an electrical circuit having an input circuit that is adapted to generate electrical pulses corresponding to the number of objects such as fruit, said objects being carried by a conveyor to containers into which they are to be placed. This input circuit contains a light sensitive cell which is positioned adjacent to this conveyor and is associated with a source of light rays that are adapted to be interrupted by said objects so as to produce electrical pulses which correspond to said objects. These electrical pulses are amplified and passed to an electrical pulse responsive circuit which includes an electronic counter provided with a settable circuit which may be preset to select a pulse that corresponds to the last object to be placed into a given container. Said selected pulse is supplied to a time delay circuit that produces a delayed pulse corresponding thereto and supplies this delayed pulse to an electronic switching circuit that is connected to control the electro-mechanical device that guides the object to the appropriate container. The time delay introduced by the delay circuit corresponds to the time that a given object requires to travel from a position opposite the light source and the light sensitive cell to the electro-mechanical guiding device that guides this object to the selected container.

Further details of this invention will be set forth in the following specification and the drawings in which briefly.

Figure 1:
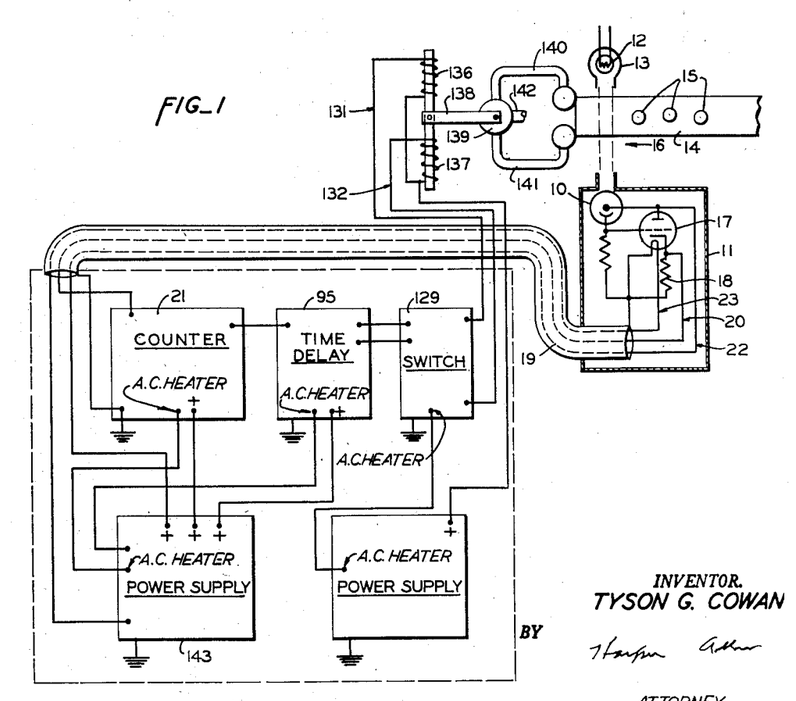
Figure 1 is a schematic wiring diagram of the electronic circuit of this invention showing the input and output circuits thereof associated with an object carrying conveyor such as is used for conveying fruit or similar objects to containers in which such objects are to be packed.

Referring to the drawings in detail there is shown in Figure 1 a schematic layout of the electrical circuits employed in accordance with this invention. The light sensitive cell 10 is positioned in a housing 11 that is provided with a suitable window through which light rays from the lamp 12 may pass into this housing to impinge upon the cathode of this cell 10. The housing 11 is positioned on one side of the conveyor 14 and the housing 13 which is provided to the lamp 12 is positioned on the other side so that the objects such as the fruit 15 positioned on the conveyor 14 will interrupt the light rays going from the light source 12 to the cell 10 as these objects are moved by the conveyor 14 in the direction of the arrow 16. When an object 15 interrupts the light rays passing from the light source 12 to the cell 10 which is connected with its cathode to the grid of the tube 17 and its anode to the anode of the tube 17, this cell functions to cause this tube to produce a pulse which manifests itself by a variation in the voltage drop across the cathode resistor 18. The lower end of this resistor 18 is connected to the sheath 19 of the shielded cable and the cathode end of this resistor is connected to the wire 20 which is one of the conductors positioned in this sheath. The sheath of this cable is connected between the housing 11 of the light sensitive cell 10 and amplifier tube 17 and the interconnecting panel shown in Figure 7 which provide suitable connections to the input counter 21 as will be described hereinafter. This cable also includes conductor 22 which supplies the anode potential to the cell 10 and the amplifier tube 17 as well as the conductor 23 which is connected to one side of the cathode heater of the tube 17. The other side of the cathode heater is connected to the sheath 19 which is grounded to the housing 11 and is also connected to the panel shown in Figure 7 to which the power supply 24 is also connected. This power supply includes devices for supplying the current to the cathode heater as well as the anode current of the cell 10 and tube 17 as will be described hereinafter.

Figure 2:
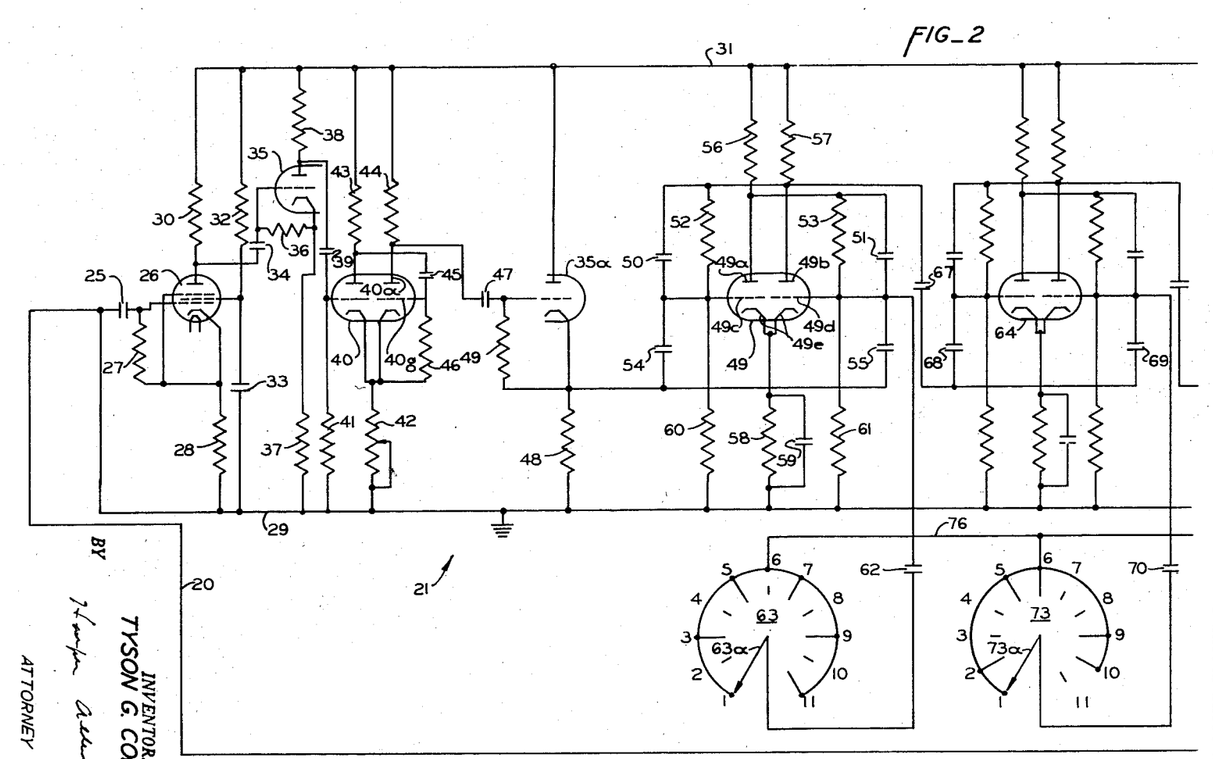
Figures 2 and 2a show a schematic wiring diagram of the electronic counter circuit and the preset controls thereof which is connected into the circuit shown in Figure 1.

The counter 21 is shown in detail in Figure 2 and the input of this counter is connected by the conductor 20 to the cathode end of the resistor 18 that is associated with the tube 17. The pulses produced by the tube 17 are thus passed over the conductor 20 and through the coupling capacitor 25 to the control grid of the input tube 26 of the counter 21. This input tube 26 is a pentode that is provided with a grid resistor 27 connected between its control grid and its cathode; a cathode resistor 28 that is connected between its cathode and the grounded line 28 and anode resistor 30 that is connected between its anode and the plate supply line 31. The screen grid of this pentode 26 is connected by the resistor 32 to the plate supply line 31 and coupled by the capacitor 33 to the grounded line 29.

The anode of the pentode 26 is coupled through a capacitor 34 to the control grid of the tube 35 which may be one-half of a double triode tube. This tube 35 which functions as a signal inverter, is provided with a grid resistor 36 that is connected between its control grid and cathode; a cathode resistor 37 that is connected between its cathode and the grounded line 29 and the anode resistor 38 that is connected between its anode and the plate supply line 31.

The anode of the tube 35 is coupled through the capacitor 39 to the control grid of the first section of the dual triode 40 which is connected as a one shot multivibrator. The tube 40 is provided with a grid resistor 41 that is connected between the control grid of the first section and the grounded line 29; a variable cathode resistor 42 that is connected between both of its cathodes to the grounded line 29; anode resistors 43 and 44 that are connected between its respective anodes and the plate supply line 31; and capacitor 45 that is coupled between the anode 40a of the first section and the control grid 40g of the second section, which latter grid is also connected through the grid resistor 46 to the cathodes.

The anode 40a of the second section of the dual triode 40 is coupled through the capacitor 47 by the control grid of the triode section 35a of the dual triode 35. The anode of this triode section 35a is connected to the plate supply line 31 and the cathode is connected through the cathode resistor 48 to the grounded line 29. A grid resistor 49 is also provided between the control grid and the cathode of this triode section.

Figure 2A:
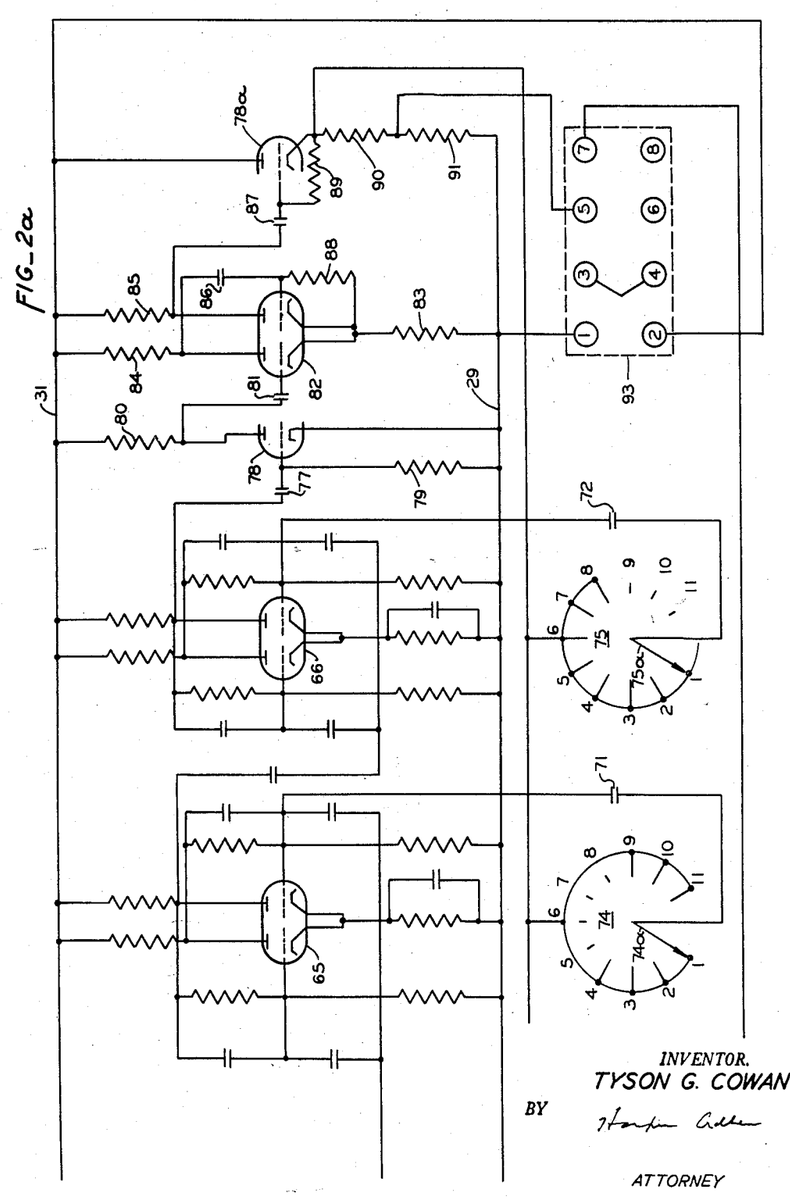

The cathode of the section 35a of the dual triode is connected to the first stage of a cascade of multivibrators. Four such multivibrator stages, which are of the Eccles-Jordan trigger type referred to as flip-flop oscillators, are illustrated in Figures 2 and 2a although a greater or lesser number may be employed if desired. Each of these multivibrator stages comprises a dual triode such as the tube 49 which includes anodes 49a and 49b, control grids 49c and 49d and cathodes 49e.

The cathode follower resistor 8 of the second triode section 35a is coupled by capacitors 54 and 55 to the control grids 49c and 49d respectively of the first multivibrator stage. Capacitor 50 shunted by resistor 52 is connected between anode 49b and grid 49c and capacitor 51 shunted by resistor 53 is connected between anode 49a and grid 49d. The anodes 49a and 49b are connected by resistors 56 and 57 respectively to the plate current supply line 31 and the cathodes 49e are connected through the resistor 58, which is shunted by capacitor 59, to the grounded line 29. Grid resistors 60 and 61 are connected between the control grids 49c and 49d respectively and the grounded line 29. In addition a capacitor 62, one side of which is connected to the control grid 49d and the other side of which is connected to the wiper arm 63a of a multiple contact selector switch 63, may be coupled between the aforesaid grid and the output of the counter for the purpose of presetting the operation of this multivibrator stage as will be described more fully hereinafter.

Additional multivibrator stages employing dual triode tubes 64, 65 and 66 are provided. The electrodes of each of these stages are connected to resistors and capacitors in substantially the same way as the first stage employing the dual triode tube 49 except that the second stage employing the dual triode tube 64 is provided with a coupling capacitor 67, one side of which is connected to the anode 49b and the other side of which is connected to the grid coupling capacitors 68 and 69, for coupling the output of the first stage multivibrator to the input of the second stage. Similar couplings are provided between the output of the second stage multivibrator and the input of the third stage, the output of which is likewise coupled to the input of the fourth stage multivibrator.

The second, third and fourth multivibrator stages are also provided with capacitors 70, 71 and 72 respectively that are connected with the wiper contacts 73a, 74a and 75a respectively of the multi contact selector switches 73, 74 and 75, respectively. These capacitors are similar to the capacitor 62 that is associated with the first multivibrator stage and the purpose thereof will be described more fully when the operation of this circuit is considered.

Each of the switches 63, 73, 74 and 75 is provided with a rotatable wiper contact as previously mentioned, and these wiper contacts are arranged to be rotatable as a unit by means of a common control. Each switch is provided with 11 stationary contact positions which are designated by the numbers 1 to 11 inclusive and selected ones of these are used in each case. Thus in the switch 63 positions 1, 3, 5, 7, 9 and 11 are provided with stationary contacts that are adapted to be engaged by the wiper contact 63a and all of these contacts are connected together to the conductor 76. The switch 73 is provided with stationary contacts at positions 1, 2, 5, 6, 9 and 10. These are connected together and also to the conductor 76. In the case of switch 74 stationary contacts are provided at positions 1, 2, 3, 4, 9, 10, and 11 and these are also connected together and to the conductor 76. Switch 75 is provided with stationary contacts at positions 1, 2, 3, 4, 5, 6, 7 and 8 and these are connected together and to the conductor 76. Thus at positions 1, 3, 5, 7, 9 and 11 of the switch 63 the capacitor 62 is connected between the control grid 49d of the second section of the twin triode 49 and the conductor 76. On the other hand the capacitor 70 that is associated with the switch 73 is connected between the control grid of the second section of the twin triode 64 and the conductor 76 at positions 1, 2, 5, 6, 9 and 10 of this latter switch. Capacitor 71 that is associated with the switch 74 is connected between the control grid of the second section of the twin triode 65 and the conductor 76 when this latter switch is at positions 1, 2, 3, 4, 9, 10 and 11. Switch 75 however is used to connect capacitor 72 between the control grid of the second section of the twin triode 66 and the conductor 76 on the first eight positions of this switch. The purpose of this switching arrangement will be more fully described hereinafter when the operation of this circuit is discussed.

Figures 3, 4:
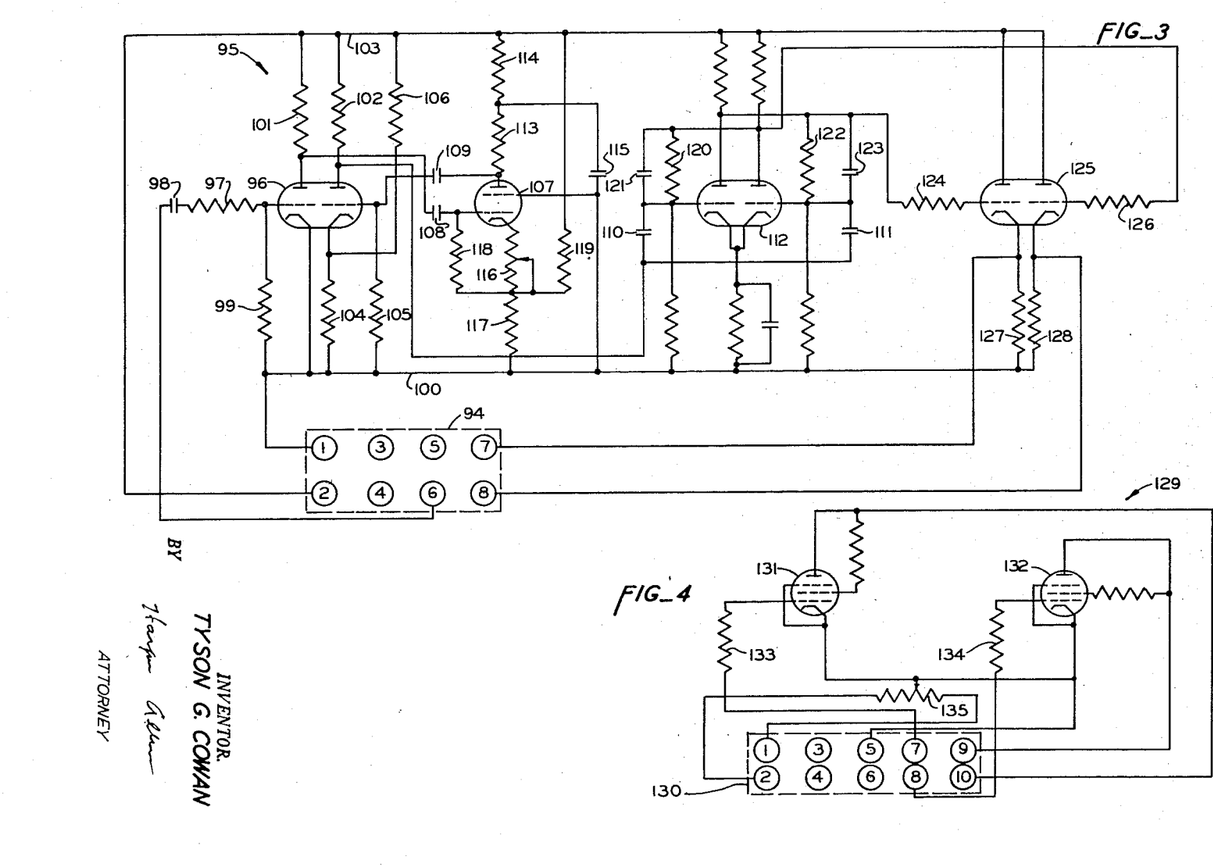
Figure 3 is a schematic wiring diagram showing the time delay circuit that is connected to the output of the counter circuit shown in Figure 2 in accordance with the circuit shown in Figure 1.
Figure 4 is a schematic wiring diagram of the electronic switching circuit that is connected to the output of the delay circuit shown in Figure 3 in accordance with the diagram shown in Figure 1.

The anode of the first section of the twin triode 66 is coupled by a capacitor 77 to the control grid of the first section of the triode 78 which functions as a signal inverter. A grid resistor 79 is connected between the control grid of this section and the ground line 29 and an anode resistor 80 is connected between the anode of this section and the plate current supply line 31. The anode of this section is coupled through the capacitor 81 to the grid of the first section of the twin triode 82 which is connected as a single shot multivibrator which functions to sharpen signal and introduce a time delay therein sufficient to permit the operation of the multivibrator stages preceding it to be stable, thus allowing the output pulse to present these stages. The cathodes of the twin triode 82 are connected together and to the grounded line 29 through the cathode resistor 83. The anodes of this twin triode are connected to the plate supply line 31 through the resistors 84 and 85, respectively. The anode of the first section of this twin triode is coupled to the control grid of the second section through the capacitor 86. The anode of the second section is coupled to the control grid of the second section 78a of the twin triode 78 through the capacitor 87. Grid resistor 88 is connected between the control grid of the second section of the twin triode 82 and the cathodes thereof. A grid resistor 89 is connected between the control grid of the triode section 78a and the cathode thereof and two cathode resistors 90 and 91 are connected in series between the cathode of this latter section and the grounded line 29. The anode of this section is connected to the plate current supply line 31 and this line is connected to the terminal member 2 of the multiple terminal connector unit 93. This unit 93 includes additional terminals 1, 3, 4, 5 and 7 connected to the counter device 21 as follows: Terminal 1 is connected to the grounded line 29 and is employed for the purpose of connecting this circuit to the negative terminal of the plate power supply as will be described hereinafter. Terminals 3 and 4 are connected to the cathode heater terminals of each of the tubes in the counter 21 for the purpose of supplying heating current thereto. Terminal 5 forms an output terminal and is connected to the junction between the cathode follower resistors 90 and 91. Terminal 7 is the input terminal to which the output of the light sensitive cell amplifier tube 17 is connected through the connections in the plug-in panel shown in Figure 7 as will appear from a detailed description of this figure. Terminal 5 of the connector unit 93 is connected to terminal 6 of the connector unit 94 that is associated with the time delay and alternating circuit 95, the circuit of which is illustrated in Figure 3.

The time delay and alternating circuit 95 includes a twin triode 96, the control grid of the first section of which is connected to the resistor 97 and the coupling capacitor 98 and the input terminal 6 of the connector unit 94. A grid resistor 99 is connected between the control grid of this section and the grounded line 100 which is also connected to the terminal 1 of the connector unit 94. The anodes of the twin triode 96 are connected through resistors 101 and 102 respectively to the plate current supply conductor 103 of this unit which is connected to terminal 2 of the connector unit 94. A cathode resistor 104 is connected between the cathode of this second section of the twin triode 96 and the line 100 and a grid resistor 105 is connected between the control grid of this second section and this line 100. A resistor 106 is connected between the plate current supply conductor 103 and the cathode of the second section of the twin triode 96.

The twin triode 96 is connected so that the signal from the anode of the first section is supplied through the capacitor 108 to the firing grid of the thyratron 107 and the anode of this thyratron is coupled through the capacitor 109 to the control grid of the second section of the twin triode 96. The anode of this second section is connected through coupling capacitors 110 and 111 to the control grids of the first and second sections, respectively, of the twin triode 112 which is connected as a multivibrator.

The anode of the thyratron 107 is connected through resistors 113 and 114 to the plate current supply conductor 103. The junction between these resistors is connected to one side of the capacitor 115 and the other side of this capacitor is connected to the auxiliary grid of the thyratron which in turn is connected to the grounded line 100. The cathode of the thyratron 107 is connected to this line 100 through the resistors 116 and 117 which are connected in series and the junction therebetween is connected to the wiper contact of the resistor 116 and to the lower terminals of the resistors 118 and 119. The upper terminal of the resistor 119 is connected to the plate current supply conductor 103 and the upper terminal of the resistor 118 is connected to the control grid of the thyratron.

The multivibrator tube 112 is provided with circuit elements similar to the multivibrator tubes 49, 64, 65 and 66 that are provided to the counter as previously described. Thus the control grid of the first section of the twin triode 112 is connected to the anode of the second section through the resistor 120 that is shunted by capacitor 121 and the control grid of the second section of this twin triode is connected to the anode of the first section through the resistor 122 that is shunted by capacitor 123. The anode of the first section of this twin triode is connected through a resistor 124 to the control grid of the first section of the twin triode 125 and the anode of the second section of the twin triode 112 is connected through the resistor 126 to the control grid of the second section of the twin triode 125. The anodes of the twin triode are connected together and to the plate current supply conductor 103 and the cathodes of the first and second sections of this twin triode 125 are provided with cathode resistors 127 and 128, respectively. The lower terminals of these cathode resistors are connected to the line 100 and the cathode terminals of these resistors 127 and 128 are connected to terminal members 7 and 8, respectively, of the connector unit 94.

Figure 7:
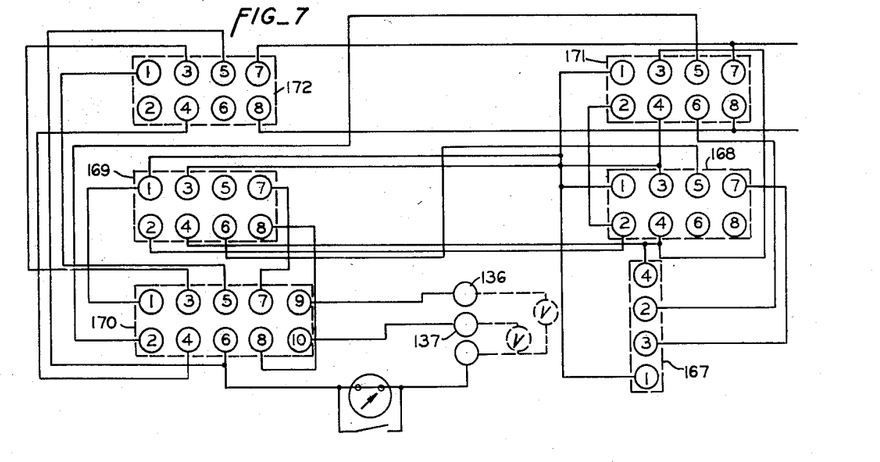
Figure 7 is a plan of the interconnecting panel employed for connecting the various units of this apparatus.

The terminal members 7 and 8 of the connector unit 94 of the delay device 95 are connected to the terminal members 7 and 8 of the connector unit 130 of the electronic switching device 129 shown in detail in Figure 4 through the plug-in board shown in Figure 7. This switching device includes a pair of pentode type power amplifying tubes 131 and 132 the control grids of which are connected through resistors 133 and 134, respectively, to the terminal members 7 and 8, respectively, of the connector unit 130. The cathodes of these tubes are connected together to the wiper contact of the potentiometer 135 and to the terminal member 5 of the connector unit 130. The ends of the resistance element of the potentiometer 135 are connected to the terminal members 1 and 2, respectively, of the connector unit 130 and the anodes of the pentodes 131 and 132 are connected to the terminal members 9 and 10 respectively of this connector unit.

The solenoids 136 and 137 shown in Figure 1 are connected in series with the anodes of the pentodes 131 and 132, respectively, and the positive terminal of the plate power supply device that is provided for supplying anode or plate current to these pentodes. The connections of this power supply circuit are shown in detail in Figure 6. These solenoids 136 and 137 are provided with armatures that are connected to the lever 138 of the air supply control valve 139 and function to connect either the pipe 140 or the pipe 141 to the air supply line 142 through the valve 139.

Figure 5:
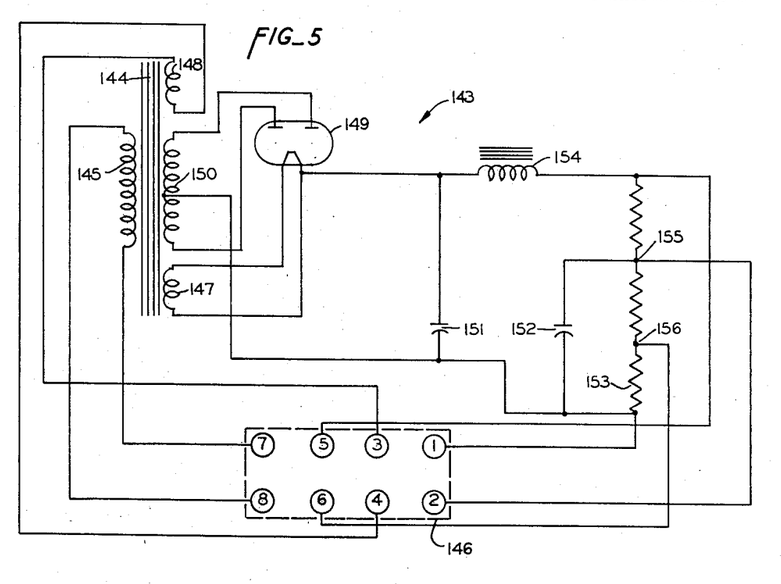
Figure 5 is a schematic wiring diagram of the power supply provided for the light sensitive cell, the counter circuit and the time delay circuit.

In Figure 5 there is shown a wiring diagram of the power supply 143 that is employed for the light sensitive cell and associated amplifier tube, the counter circuit 21 and the time delay and alternating circuit 95. This power supply includes a transformer 144 having a primary winding 145 that is connected to the terminals 7 and 8 of the connector unit 146. Through these terminals this primary winding is connected to the plug-in board shown in Figure 7 which is connected to a suitable source of 115 volt AC power. Low voltage secondary windings 147 and 148 are provided to this transformer and the winding 147 is connected to heat the cathode of the full wave rectifier tube 149. The winding 148 is connected to the terminals 3 and 4 of the connector unit 146 and through these terminals and the plug-in board filament heating power is supplied to the cathode heaters of the aforesaid amplifier tube 17 that is associated with the light sensitive cell 10, to the cathode heaters of all of the tubes in the counter 21 and to all of the cathode heaters of the time delay and alternating circuit 95. The transformer 144 also includes a high voltage secondary winding 150 that is provided with a center tap which is connected to the bottom terminals to the filter capacitors 151 and 152, to the bottom terminal of the voltage divider resistor 153 and to the terminal of the connector unit 146. The ends of the secondary winding 150 are connected to the respective anodes of the full wave rectifier 149. The cathode of this rectifier is connected to the top terminal of the filter capacitor 151 and to one side of the choke coil 154. The other side of this choke coil is connected to the top terminal of the voltage divider resistor 153 and to the terminal 5 of the connector unit 146. This voltage divider resistor 153 is provided with taps 155 and 156. Tap 155 is connected to the top terminal of the filter capacitor 152 and to the terminal 2 of the connector unit 146 and tap 156 is connected to the terminal 6 of this connector unit.

A separate power supply (Figure 6) is provided for the power switching tubes that are shown in Figure 4. This power supply circuit is similar to that shown in Figure 5 in that it employs a transformer 157 having a primary winding 158, two low voltage secondary windings 159 and 160 and a high voltage secondary winding 161, the ends of which are connected to the anodes of the full wave rectifier 162.

Figure 6:
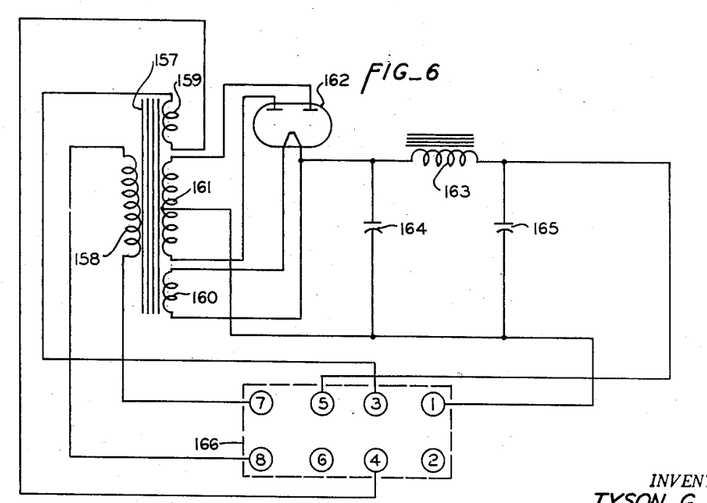
Figure 6 is a schematic wiring diagram of the power supply provided for the electronic switch.

The filament of the rectifier 162 is connected to the low voltage secondary winding 160 and one side of this filament is also connected to one side of the choke coil 163 and to the top of the filter capacitor 164. The other side of the choke coil 163 is connected to the top of the filter capacitor 165 and to the terminal 5 of the connector unit 166. The center tap of the high voltage secondary winding 161 is connected to the bottom terminals of the filter capacitors 164 and 165 and to the terminal 1 of the connector unit 166. The ends of the low voltage secondary winding 159 that is employed for energizing the cathode heaters of the tubes 131 and 132 of the switching unit shown in Figure 4, are connected to the terminals 3 and 4 of the connecting unit 166. The ends of the primary winding 158 are connected to the respective terminals 7 and 8 of the connector unit 166.

The counter unit 21 shown in Figure 2 and 2a together with the time delay and alternating circuit 95 shown in Figure 3 and the switching unit 129 shown in Figure 4 as well as the power supplies shown in Figures 5 and 6 are each made in the form of a separate unit provided with appropriate plug-in connectors 93, 94, 130, 146 and 166, respectively, that are adapted to be plugged into the socket units 168, 169, 170, 171 and 172, respectively, of the plug-in panel shown in Figure 7 for the purpose of connecting these together and also for the purpose of supporting these units on this panel. The panel is also provided with a plug-in unit 167 that has four plug receiving sockets into which the shielded cable from the light sensitive cell and amplifier tube 17 is adapted to be plugged. The sockets 1, 2, 3 and 4 of the unit 167 are connected to appropirate sockets of units 168 and 171 so that the signal from the light sensitive cell is supplied to the input of the counter and the required power is supplied to the light sensitive cell and the amplifier tube associated therewith, from the power supply that is connected to unit 171. The connections between the various socket units of the plug-in board shown in Figure 7 are as follows: Socket 1 of unit 167 is connected to sockets 1 of both units 168 and 171. Socket 2 of unit 167 is connected to socket 6 of the unit 171 so that plate voltage is supplied to the amplifier 17 and also to the anode of the cell 10. Socket 3 of the unit 167 is connected to socket 7 of the unit 168 so that the signal is carried from the cathode follower of the amplifier 17 to the input of the amplifier tube 26 of the counter 21. Socket 4 of unit 167 is connected to socket 4 of unit 168 and the socket 3 of unit 171 to form one side of the cathode heater current circuit to the cathode heater of tube 17. The other side of the cathode heater of this tube is connected to the sheath of the cable which is connected with the socket 1 of unit 167 to form the other side of this circuit. It will be observed that this socket is connected to both sockets 1 and 3 of the unit 168 and socket 4 of unit 171. Thus the low voltage winding 148 of the transformer 144 of the power supply 143 is connected through the connector units 167, 168 and 171 to supply the cathode heaters not only of the amplifier tube 17 but also all of the tubes in the counter unit 21 and in addition to this it supplies the cathode heaters of all of the tubes in the time delay and alternating circuit 95 through the connections to the sockets 3 and 4 of the connector unit 169, which sockets are connected to the sockets 3 and 4, respectively of the unit 168.

The anodes of the tubes employed in the counter unit 21 are all connected to plug-in terminal 2 of the connector unit 93 associated therewith and since this connector unit is adapted to be plugged into the connector unit 168 of the board shown in Figure 7, power for the anodes of the tubes in the counter unit is supplied through the connection to the terminal 2 of the unit 168 which is connected to the terminal 2 of the power supply connector unit 171. The anodes of the tubes of the time delay and alternating circuit 95 are all connected to the terminal 2 of the connector unit 94 and through this terminal and socket 2 of the unit 169 to the positive terminal 2 of the unit 171.

The output of the counter unit is connected to the terminal 5 of the unit 93 and this terminal is adapted to be connected through the socket 5 of the connector unit 168 to the socket 6 of the connector unit 169 through which pulses are supplied to the input of the time delay and alternating circuit 95. The outputs of the dual triode tube 125 of this circuit are connected to the respective plug-in terminals 7 and 8 of the connector unit 94 and through these terminals, which are adapted to be received by the connector unit 169, signals are supplied to the grids of the switching tubes 131 and 132 of the switching circuit 129 since the plug-in terminal unit 130 of this switching unit is adapted to be plugged into the socket unit 170.

The power supply shown in Figure 6 is adapted to be plugged into the socket unit 172 of the plug-in panel shown in Figure 7, for the purpose of supplying power to the switching unit 129 that is plugged into the socket unit 170. Power for the cathode heaters of the switching tubes 131 and 132 is supplied by the low voltage secondary winding 159 to the terminals 3 and 4 of the socket unit 172 which are connected to the terminals 3 and 4 of the socket unit 170 and these in turn are connected to the cathode heaters of the aforesaid tubes 131 and 132. The anodes of the tubes 131 and 132 are connected to the terminals 9 and 10, respectively, of the connector 130 and through these connection is made to the sockets 9 and 10 of the connector 170. These sockets are connected to one side of the solenoids 136 and 137 respectively. The other sides of these solenoids are connected together and to the socket terminal 6 of the connector 170 which in turn is connected to the socket terminal 5 of the connector 172 that makes contact with the plug-in terminal 5 of the connector 166 that forms the positive terminal of the high voltage power supply shown in Figure 6.

The operation of this invention is as follows:

As previously mentioned, the objects 15 on the conveyor 14 interrupt the light rays passing to the light sensitive cell 10 and thereby cause the amplifier tube 17 to produce electrical pulses which are transmitted over the conductor 20 of the cable to the control grid of the tube 26 which forms the input stage of the counter circuit 21. These pulses are amplified by the tube 26 and impressed upon the control grid of the first section of the dual triode 35 which in addition to functioning as an amplifier also functions as a pulse inverter. Pulses are supplied from the anode of this first triode section of the tube 35 to the control grid of the first section of the dual triode 40. This dual triode is connected as a single shot multivibrator and the input of the first stage of the multivibrator cascade including the tubes 49, 64, 65 and 66.

These multivibrators are connected as flip-flop type oscillators each of which includes a dual triode tube. These flip-flop oscillators are in effect frequency dividers in that one pulse is produced normally in the output of each flip-flop stage for each two pulses supplied to the input. Thus if these four flip-flop stages including the tubes 49, 64, 65 and 66 are operated as conventional flip-flop oscillators supplying eight impulses to the input of the first stage would result in the supplying of one impulse to the input of the stage 66 and supplying sixteen pulses to the input stage 49 would result in one output pulse being supplied to the input of the single shot multivibrator 82 through the inverter stage including the first triode section of the tube 78. However, by manipulating the selector switches 63, 73, 74 and 75 so that selected ones thereof are arranged to connect selected ones of the capacitors 62, 70, 71 and 72, respectively, to the circuits of the flip-flop stages 49, 64, 65 and 66, respectively, the operation of these flip-flop stages may be controlled so that for different selected numbers of input pulses one output pulse is caused to appear on the cathode follower resistors 90 and 91 of the output section 78a.

At the time the operation of the circuit is first started, the multivibrators 49, 64, 65, 66 and 112 may be conditioned with either side conducting, so that an indeterminate count will occur, as will be explained later, until a negative output pulse will be produced by the tube 66, the last in the cascade of multivibrators. This indeterminate counting operation is a function of the setting of the gang switch including the switches 63, 73, 74 and 75, respectively, and will eventually result in a negative output pulse produced by the tube 66. This negative pulse is inverted by the triode section 78 and the resulting positive pulse therefrom triggers the one shot multivibrator 82 which generates a square positive pulse. This square pulse is differentiated resulting in a sharp positive pulse followed after a delay time, as determined by the values of resistor 88 and capacitor 86, by a sharp negative pulse, both pulses being applied to the triode section 78a acting as a cathode follower. The cathode follower 78a having zero bias passes only the negative pulse, and this output negative pulse from the cathode follower 78a is transmitted both to the time delay circuit and is also used to preset the counter to the selected count as determined by the setting of the gang switch of the control circuit.

The switches 63, 73, 74 and 75 of the gang switch are arranged so that various combinations of the multivibrators may be selectively pulsed by an output pulse from the cathode follower 78a, and the multivibrators 49, 64, 65 and 66 which are pulsed will be placed in the condition of having their first sections conducting so that the first input pulse to any of these conditioned multivibrators will produce an output pulse. This occurs because a negative input pulse to one of the multivibrators quenches the section which is conducting and applies a positive pulse to the other section to cause it to conduct.

Thus if the switches 63, 73, 74 and 75 are in the positions illustrated in Figures 2 and 2a all of the multivibrators 49, 64, 65 and 66 are coupled to receive the output pulse of the triode section 78a and are therefore conditioned with their first section or half conducting after this output pulse. With the circuit in this condition one input pulse to the multivibrator 49 will immediately pulse multivibrator 64, and sequentially pulse multivibrator 65 and the multivibrator 66 to cause firing of the single shot multivibrator 82. This setting of the switches as shown in Figures 2 and 2a conditions the circuit for one pulse operation or counting; in other words, a negative output pulse from the triode section 78a will occur for each input pulse to the multivibrator 49.

When the gang switch comprising the switches 63, 73, 74 and 75 are set in position number "2," all the multivibrators 49, 64, 65 and 66 are coupled to receive the output pulse from the tube 78a except the multivibrator 49. In this setting of the circuit, the first pulse into the multivibrator 49 from the tube section 35a quenches the second section of the multivibrator which applies a positive pulse to make the first section of the multivibrator 49 conducting. As a result the second pulse from tube section 35a into the multivibrator 49 will in effect go all the way through the multivibrators 64, 65 and 66 to operate the single shot multivibrator 82 and produce an output pulse from the triode section or cathode follower 78a. As previously explained, this negative output pulse is applied both to the gang switch and to the time delay circuit.

If the gang switch is set in position number "8," for example, only the multivibrator 66 is coupled to receive the output pulse from the tube section 78a so that the multivibrators 49, 64 and 65 will operate in the normal fashion as a scale of eight counter, producing an output pulse into the multivibrator 66 which immediately causes operation of the single shot multivibrator 82 at the end of a count of 8. The operation of the circuit for the count of 8 is as follows, assuming the circuit to have been preset by being pulsed the number of times required to produce one output pulse, the first input pulse changes the multivibrator from a condition with a second section conducting to a condition with the first section conducting. The second input pulse changes the multivibrator 48 from first section conducting to second section conducting, thus producing an output pulse from multivibrator 48 which in turn changes the multivibrator 64 from second section conducting to first section conducting. The next two pulses operate multivibrator 48 in the same manner to produce a second input pulse to the multivibrator 64 which changes from first section conducting to second section conducting, and produces an output pulse to the multivibrator 65 to change it from a second section conducting to first section conducting. The fifth and sixth input pulses operate multivibrator 49 in the same manner to produce the input pulse to the multivibrator 64, as also do the seventh and eighth pulses, which will feed two pulses to the multivibrator 65 causing a second pulse from this multivibrator to the multivibrator 66. As previously explained the multivibrator 66 being previously conditioned by the control circuit, the pulse to this multivibrator immediately results in pulsing the single shot multivibrator 82, this operation occurring at the end of a count of eight.

The other settings of the gang switch including switches 63, 73, 74 and 75 operate in a similar manner to select a combination of the multivibrator tubes 49, 64, 65 and 66 which will result in one output pulse after a number of counts corresponding to the preset counting number.

As previously explained, each output pulse from the triode section 78a is also transmitted to the time delay circuit, and this output pulse from the section 78a is applied to the terminal 5 of the connector unit 93.

This output pulse appearing on the cathode follower resistors 90 and 91 is utilized to activate the control circuit including the switches 63, 73, 74 and 75 and their connected capacitors 62, 70, 71 and 72 and is also transmitted to the time delay circuit through the terminal 5 of the connector unit 93. Therefore the output pulse which in normal operation will correspond to the input selected according to the number of units passing on the conveyor 14 and interrupting the light ray is utilized both through the control circuit to condition the counter for the next counting operation and is also passed on to the electro-mechanical means associated with the containers being filled.

The operation will be described first in connection with the functioning of the counter circuit 21 as a preset counter under the control of its own output pulse and associated control circuit. From this terminal 5 the pulse is supplied to the control grid of the first triode section of the tube 96 of the time delay and alternating circuit 95. The anode of this section supplies a pulse to the control grid of the thyratron 107 which is connected to introduce a time delay of a duration corresponding to the length of time required for an object 15 to pass from its light interrupting position, between the light sensitive cell 10 and the light source 12, to the air system provided by either one of the nozzles 140 and 141.

The thyratron 107 and its associated circuits function in the following manner to produce this time delay.

The thyratron 107 may be fired by a positive pulse applied to its control grid from the anode of the first triode section of the tube 96. Firing the thyratron 107 causes a current to flow through it and through the resistors 113, 114, 116 and 117. The value of the resistor 114 is chosen large enough so that it will produce a substantial voltage drop and thus reduce the voltage across the thyratron so that this tube is quenched. The length of time that the thyratron conducts is a function of the time constants of the RC circuit including the capacitor 115 and the resistors 113, 116 and 117 and the resistance of the thyratron. By adjusting the value of the resistor 116 this time constant may be varied.

Thus when the thyratron is fired and starts to conduct, its anode swings sharply negative and of course applies a negative pulse to the grid of the section of the triode 96. However, when the thyratron is quenched, the anode thereof again becomes positive. This relatively wide pulse may be differentiated so as to produce a negative and a positive pulse separated by a time equal to the time constant mentioned above and by this means a variable time delay is produced.

The delayed pulse is amplified by the second triode section of the tube 96 and fed from the anode thereof to the multivibrator 112 which is connected as a flip-flop type of oscillator.

The values of the circuit elements of this oscillator may be chosen so that it functions only on the delayed, i. e., positive, pulse produced by the thyratron as described above. However, the outputs of the two sections of this dual triode 112 are so connected to the control grids of the dual triode 125 that the first and second sections of this tube 125 are alternately rendered conductive and therefore signal pulses occur alternately across the cathode resistors 127 and 128 which are connected to the control grids of the tubes 131 and 132 respectively. The tubes 131 and 132 of the switching circuit 129 have the anodes thereof connected to the solenoids 136 and 137, respectively, so that these solenoids may be alternately energized in accordance with the operation of this circuit. In this way the air supply to the nozzles positioned at one end of the conveyor 14 may be alternately connected to the compressed air supply so that the objects 15 fed by the conveyor may be guided by the air stream from either one of these nozzles to the selected container. Thus when a preset number of objects are fed by the conveyor to the selected container, the selected electrical pulse produced by the last of said preset number of objects is employed to control one or the other of the switching tubes 131—132 so that these tubes function to energize one or the other of the solenoids 136—137 to operate the valve 139 associated with the air supply 142 and deflect it from one of the nozzles to the other. Thus, if the nozzle 140 was supplying the air stream, the air supply would be deflected from it to the nozzle 141 and vice versa.

It will be apparent that either the first pulse corresponding to the first of a preset number of objects or the last pulse corresponding thereto may be employed to energize one or the other of the solenoids associated with the air supply valve.

From the above description it will be apparent that the preset counting circuit as described above can be selectively conditioned to count any number from 1 to 12, and to change the condition of the associated apparatus upon the counting of the selected number of pulses. It will also be obvious that the indeterminate count of the first counting operation is solely a function of adjusting or setting the circuit and apparatus, and that the articles counted in this first indeterminate count may be returned to the source of supply for subsequent correct counting. It will also be obvious that at any time during the operation that a change in the setting of the preset count is desired that one erroneous count and fill will result while reconditioning itself to the new number to be counted, and that this erroneous or indeterminate count should also be discarded. Usually such a change in the setting will only be made at the beginning of a run.

In a typical circuit embodying the above-described invention, the circuit components have the following values:

*Resistors*

| | |
|---|---:|
| 27, 97, 124, 126, 133 and 134 ____ megohms __ | 2.7 |
| 32, 42, 48, 83, 116, 127 and 128 ________ do ____ | .1 |
| 33, 80, 101, 102 ___________________ do ____ | .27 |
| 36, 79, 99, 105 and 114 ______________ do ____ | 2.2 |
| 43, 44, 84 and 85 __________________ do ____ | .33 |
| 46 and 88 _________________________ do ____ | 1.8 |
| 49, 89 and 135 ____________________ do ____ | 1 |
| 52, 53, 120 and 122 _________________ do ____ | .82 |
| 60 and 61 _________________________ do ____ | .22 |
| 56 and 57 _________________________ do ____ | .15 |
| 30 ________________________________ do ____ | .47 |
| 41 ________________________________ do ____ | 1.2 |
| 58 ________________________________ do ____ | .027 |
| 90 ________________________________ do ____ | .033 |
| 91 ________________________________ do ____ | .060 |
| 104 _______________________________ do ____ | .010 |
| 106 _______________________________ do ____ | .15 |
| 117 _______________________________ do ____ | .12 |
| 118 _______________________________ do ____ | 3.3 |
| 119 _______________________________ do ____ | .75 |
| 28 and 37 ________________________ ohms __ | 1500 |

*Tubes*

| | |
|---|---:|
| 26 | #6AU6 |
| 40, 49, 64, 65, 66, 82, 35 and 35a, 78 and 78a, 96, 112, 125 | #12AU7 |
| 107 | #2DZ1 |
| 131 and 132 | #6L6 |

*Capacitors*

| | |
|---|---:|
| 25, 59, 108 _______________ microfarads __ | .01 |
| 33 _______________________________ do ____ | .05 |
| 39, 98 ____________________________ do ____ | .004 |
| 45, 50, 51, 81, 86, 181, 123 _________ do ____ | .002 |
| 54, 55, 68 _______________ micromicrofarads __ | 50 |
| 62 ________________________________ do ____ | 27 |
| 67 ________________________________ do ____ | 15 |
| 34, 72 ____________________________ do ____ | 30 |
| 70, 71 ____________________________ do ____ | 25 |
| 47, 87 ____________________________ do ____ | 10 |
| 77, 110, 111 _______________________ do ____ | 100 |
| 109 _______________________________ do ____ | 500 |

While I have shown a preferred embodiment of the invention, it will be understood that the invention is capable of variation and modification from the form shown so that its scope should be limited only by the scope of the claims appended hereto.

I claim:

1. An electronic device for controlling the operation of container filling apparatus comprising an input circuit adapted to produce an electrical pulse corresponding to each object supplied to a container, an electrical pulse responsive circuit, said last-mentioned circuit having adjustable means to control the response thereof to a preset number of pulses supplied thereto from said input circuit, said preset number of pulses corresponding to the number of objects supplied to a given container, a switching circuit connected to said pulse responsive circuit having alternately energized output circuits, electromechanical control apparatus connected to the output circuits of said switching circuit to be operated after the preset number of pulses is supplied to said pulse responsive circuit, said electromechanical control apparatus having a pair of solenoids and valve means adapted to be operated by said solenoids to control a compressed air stream, connections for connecting one of said alternately energized output circuits to one of said solenoids and for connecting the other of said alternately energized circuits to the other of said solenoids, whereby said air stream may be controlled to deflect alternate preset numbers of said selected objects into different containers.

2. An electronic control device for controlling the operation of container filling apparatus comprising an input circuit adapted to produce an electrical pulse corresponding to each object supplied to a container, an electrical pulse responsive circuit for receiving the electrical pulses and comprising a cascade of multivibrators connected as flip-flop type oscillators, an output circuit connected to receive an output pulse from the final one of said cascade of multivibrators, and a selectively settable circuit for transmitting said output pulse to selected ones of said multivibrators to preset said multivibrators so that the cascade responds to a count of a selected number of input pulses, a switching circuit connected to said pulse responsive circuit, said switching circuit having alternately energized output circuits, electromechanical control apparatus connected to the output circuits of said switching circuit to be operated after the preset number of pulses is supplied to said pulse responsive circuit, said electromechanical control apparatus having a pair of solenoids and valve means adapted to be operated by said solenoids to control a compressed air stream, connections for connecting one of said alternately energized output circuits to one of said solenoids and for connecting the other of said alternately energized circuits to the other of said solenoids, whereby said air stream may be controlled to deflect alternate preset numbers of said selected objects into different containers.

3. An electronic control device for controlling the operation of container filling apparatus comprising an input circuit adapted to produce an electrical pulse corresponding to each object supplied to a container, an electrical pulse responsive circuit for receiving the electrical pulses and comprising a cascade of multivibrators connected as flip-flop type oscillators, an output circuit connected to receive an output pulse from the final one of said cascade of multivibrators, and a selectively settable circuit for transmitting said output pulse to selected ones of said multivibrators to prepulse said selected ones so that each prepulsed multivibrator produces one output pulse for each input pulse, a switching circuit connected to said pulse responsive circuit, said switching circuit having alternately energized output circuits, electromechanical control apparatus connected to the output circuits of said switching circuit to be operated after the preset number of pulses is supplied to said pulse responsive circuit, said electromechanical control apparatus having a pair of solenoids and valve means adapted to be operated by said solenoids to control a compressed air stream, connections for connecting one of said alternately energized output circuits to one of said solenoids and for connecting the other of said alternately energized circuits to the other of said solenoids, whereby said air stream may be controlled to deflect alternate preset numbers of said selected objects into different containers.

4. An electronic control device for controlling the operation of container filling apparatus comprising an input circuit adapted to produce an electrical pulse corresponding to each object supplied to a container, an electrical pulse responsive circuit for receiving the electrical pulses and comprising a cascade of multivibrators connected as flip-flop type oscillators, an output circuit connected to receive an output pulse from the final one of said cascade of multivibrators, means associated with said container filling apparatus for utilizing said output pulse, and a selectively settable circuit also connected to said output circuit for utilizing said output pulse to preset said multivibrators, a switching circuit connected to said pulse responsive circuit, said switching circuit having alternately energized output circuits, electromechanical control apparatus connected to the output circuits of said switching circuit to be operated after the preset number of pulses is supplied to said pulse responsive circuit, said electromechanical control apparatus having a pair of solenoids and valve means adapted to be operated by said solenoids to control a compressed air stream, connections for connecting one of said alternately energized output circuits to one of said solenoids and for connecting the other of said alternately energized circuits to the other of said solenoids, whereby said air stream may be controlled to deflect alternate preset numbers of said selected objects into different containers.

5. An electronic control device for controlling the operation of container filling apparatus comprising an input circuit adapted to produce an electrical pulse corresponding to each object supplied to a container, an electrical pulse responsive circuit for receiving the electrical pulses and comprising a cascade of multivibrators connected as flip-flop type oscillators, an output circuit connected to receive an output pulse from the final one of said cascade of multivibrators, means associated with said container filling apparatus for utilizing said output pulse, and a control circuit also connected to said output circuit for utilizing said output pulse to preset said multivibrators so that the cascade responds to a count of a selected number of input pulses, a switching circuit connected to said pulse responsive circuit, said switching circuit having alternately energized output circuits, electromechanical control apparatus connected to the output circuits of said switching circuit to be operated after the preset number of pulses is supplied to said pulse responsive circuit, said electromechanical control apparatus having a pair of solenoids and valve means adapted to be operated by said solenoids to control a compressed air stream, connections for connecting one of said alternately energized output circuits to one of said solenoids and for connecting the other of said alternately energized circuits to the other of said solenoids, whereby said air stream may be controlled to deflect alternate preset numbers of said selected objects into different containers.

6. An electronic control device for controlling the operation of container filling apparatus comprising an input circuit adapted to produce an electrical pulse corresponding to each object supplied to a container, an electronic pulse counting circuit comprising a plurality of counting stages, said last mentioned circuit having multiple contact switch means and impedance devices adapted to be connected to selected stages of said counting circuit to preset the total number of pulses to which said counting circuit is responsive in a cycle of operation, said preset number of pulses corresponding to the number of objects supplied to a given container, said switch means having a manual control and a dial with indications opposite different positions of said switch means indicating the total number of pulses to which said counting circuit is responsive in a cycle of operation in the different positions of said switch means, electromechancal control apparatus, an amplifier connected to the output of said counting circuit, time delay means connected to said amplifier for introducing a time delay to the amplified pulses corresponding to the length of time required for said selected object to pass between said input circuit and the instant that said selected object is to be guided to the given container, a switching circuit connected to said time delay means, said switching circut having alternately energized output circuits, said electromechanical control apparatus having a pair of solenoids and valve means adapted to be operated by said solenoids to control a compressed air stream, connections for connecting one of said alternately energized output circuits to one of said solenoids and for connecting the other of said alternately energized output circuits to the other of said solenoids, whereby said air stream may be controlled to deflect alternate preset numbers of said selected objects into different containers.

References Cited in the file of this patent

UNITED STATES PATENTS

| | | |
|---|---|---|
| 1,921,863 | Bickley | Aug. 8, 1933 |
| 1,959,238 | Horsfield | May 15, 1934 |
| 2,523,517 | Potter | Sept. 26, 1950 |
| 2,594,337 | Noe | Apr. 29, 1952 |
| 2,730,302 | Roberts | Jan. 10, 1956 |

OTHER REFERENCES

Predetermined Counters, John J. Wild, Electronics, March 1947, pages 120–123.

Predetermined Counter, Richard J. Blume, Electronics, February 1948, pages 88–93.